United States Patent [19]

Krebs

[11] 3,859,143

[45] Jan. 7, 1975

[54] STABLE BONDED BARRIER LAYER-TELLURIDE THERMOELECTRIC DEVICE

[75] Inventor: Thomas Richard Krebs, Huntingdon Valley, Pa.

[73] Assignee: RCA Corporation, New York, N.Y.

[22] Filed: Dec. 18, 1972

[21] Appl. No.: 316,218

Related U.S. Application Data

[63] Continuation of Ser. No. 57,592, July 23, 1970, abandoned.

[52] U.S. Cl. .................... 136/205, 29/573, 136/236, 136/237, 136/238, 136/239

[51] Int. Cl. .................... H01v 1/04

[58] Field of Search.... 136/201, 203, 205, 236–239; 29/573; 322/2, 57, 592

[56] References Cited

UNITED STATES PATENTS

| | | | |
|---|---|---|---|
| 3,000,092 | 9/1961 | Scuro | 29/573 |
| 3,082,277 | 3/1963 | Lane et al. | 136/238 X |
| 3,203,772 | 8/1965 | Intrater | 29/573 X |
| 3,351,498 | 11/1967 | Shinn et al. | 136/205 |
| 3,432,365 | 3/1969 | Katz et al. | 136/237 |
| 3,434,888 | 3/1969 | Beaver | 136/239 |
| 3,447,233 | 6/1969 | Webb | 29/573 X |
| 3,528,893 | 9/1970 | Christie et al. | 29/573 X |
| 3,650,844 | 3/1972 | Kendall | 136/237 |

FOREIGN PATENTS OR APPLICATIONS

| | | | |
|---|---|---|---|
| 252,576 | 5/1963 | Australia | 136/205 |
| 193,586 | 5/1967 | U.S.S.R. | 136/237 |

OTHER PUBLICATIONS

Lyman, "Metals Handbook," 1948 ed., pp. 310–311, American Society for Metals (1948) Cleveland, Ohio, TA 472 A3 1948.

*Primary Examiner*—Leland A. Sebastian
*Assistant Examiner*—E. A. Miller
*Attorney, Agent, or Firm*—Edward J. Norton; William Squire

[57] ABSTRACT

A stable, highly efficient, low resistance bonded thermoelectric device in which a barrier layer is disposed between an electrode and a thermoelement, the barrier layer being impermeable to diffusing contaminants from the electrode while having a coefficient of thermal expansion substantially different from that of the electrode and thermoelements. The barrier is constructed such that it will deform with the electrode and thermoelement when subjected to temperature variations rather than cause thermal stress failure of the bonded assembly.

1 Claim, 4 Drawing Figures

INVENTOR.
Thomas R. Krebs
BY
ATTORNEY

STABLE BONDED BARRIER LAYER-TELLURIDE THERMOELECTRIC DEVICE

This is a continuation of application Ser. No. 57,592, filed July 23, 1970, now abandoned.

BACKGROUND OF THE INVENTION

The present invention relates to the bonding of an electrode to a thermoelement to form a thermoelectric device.

In thermoelectric devices, a p-type semi-conductor is coupled to an n-type semi-conductor forming a pair of thermoelectric legs in which an electrode shoe is bonded at opposite axially aligned ends of each respective one of the semi-conductors. At one end of each leg an electrically conductive bridging member is brazed to the respective electrode shoe. The other end of each leg is coupled to an electrically conductive wire. In operation of the device, either the common electrode shoes or the separate electrode shoes are heated, thereby providing a hot junction, and the remaining electrode shoes are cooled to provide a cold junction. The temperature differential in the two junctions sets up an electromotive force commonly known as the Seebeck effect, and may be regarded as due to the charge carrier concentration gradient produced by a temperature gradient in the two materials.

However, bonding electrodes to semiconductors has in the past been a troublesome and much investigated technique. The reason for this is that a semiconductor is highly sensitive to contamination by the materials which may be employed to form junctions thereto, and which materials are otherwise acceptable mechanically, thermally, and electrically. This contamination occurs because such materials easily diffuse into or react with the semiconductor and adversely change the properties and usefulness thereof. Also, high contact resistance develops when there is a reaction and the element may separate mechanically from the shoe. As a result, many different combinations of shoe materials and bonding materials in a variety of fabrication processes have been tried to form a thermoelectric device; such combinations have met with little success in achieving a long term stable bonded thermoelectric device.

In addition to controlling the diffusion of foreign impurities into the semi-conductor material, the semi-conductor-shoe junction is preferably made so that it has a low thermal and electrical resistance and has a mechanical strength at least as great as that of the semiconductor. Another difficulty encountered in such devices is the failure of the bond of the shoe to the semiconductor due to thermal shock; that is, temperature variations of the device encountered at its normal operating temperatures results in bond failures due to thermal stresses at the bond interface. The magnitude of the stresses is related to the difference in thermal expansion between the element and the shoe. An investigation of these bonding difficulties is reported in a study entitled "Thermoelectric Bonding Study" by Abraham L. Eiss under United States government contract NAS 5–3973 to Hittman Associates, Inc., dated January 1966.

The significance to be attached to these causes of failure (reaction with or diffusion by contaminants and thermal stresses) is that those materials which are satisfactory as an electrode with respect to the comtamination problem are unsatisfactory with respect to the thermal stress problem and vice versa; i.e., those materials that are satisfactory with respect to the thermal stress problem are unsatisfactory with respect to the contamination problem. Consequently, the most reliable bonds to date for long term operation are achieved by the use of mechanical spring loaded devices rather than by the use of chemical or metallurgical bonds.

Therefore, it is an object of the present invention to provide a stable bonded thermoelectric device and a method for making such a device.

It is another object of the present invention to provide a metallurgically bonded thermoelectric device and method for making the same in which neither thermal stress failure nor contamination of the thermoelectric occur over extended time periods.

IN THE DRAWINGS

SUMMARY OF THE INVENTION

In accordance with one feature of the present invention, a barrier layer, impermeable to diffusing contaminants, is disposed between a thermoelement and an electrode shoe for preventing the comtamination of the thermoelement by the shoe. The thermoelement, barrier, and shoe are bonded together to form an integral assembly. The barrier has a coefficient of thermal expansion different from the shoe and thermoelement, and to prevent failure of the bond due to thermal stresses exerted by the barrier due to these different coefficients when subjected to temperature variations, the barrier is made thin enough to deform with the expansion and contraction of the shoe and thermoelement during these temperature variations. At the same time, the barrier is thick enough to be impermeable to contaminants which might otherwise diffuse therethrough.

In accordance with a method for making a device according to the present invention, a portion of a layer of nickel is diffused into a layer of refractory material along a surface of the refractory material to be bonded, and the remaining portion of the nickel layer is alloyed with the thermoelement by applying heat and pressure to urge the refractory material and thermoelement together for a time sufficient to force out most of the alloy from the interface between the refractory material and the thermoelement. The layer of alloy formed is such that it is sufficiently thin to prevent contamination of the thermoelement by the nickel, and sufficiently thick to form a bond between the barrier and the thermoelement.

DETAILED DESCRIPTION

Figure 1:
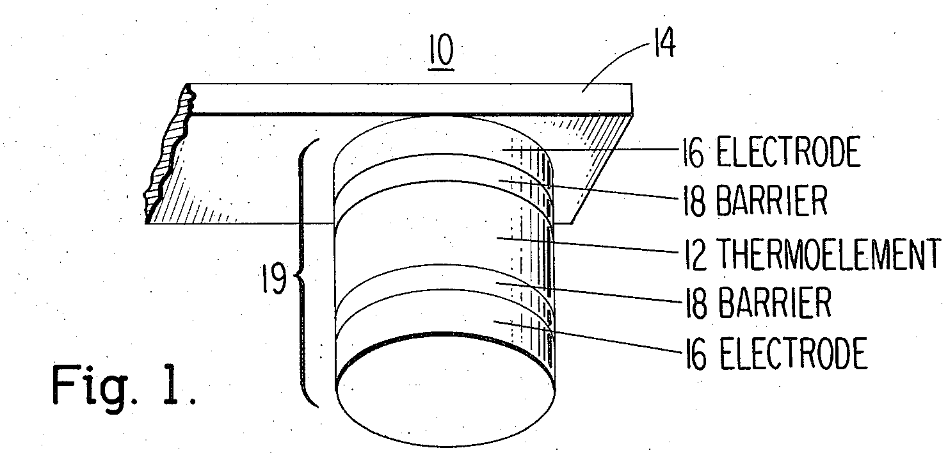
FIG. 1 is a perspective view of one leg of a thermoelectric generator constructed in accordance with an embodiment of the present invention.

A thermoelectric device, in accordance with the present invention, includes a plurality of semiconductor thermoelements electrically coupled by a conductive bridging member as partially illustrated in FIG. 1. In FIG. 1, thermoelectric leg 10 of a thermoelectric generator includes a thermoelement of semi-conductor material 12 bonded to electrode shoes 16 at both ends of the semi-conductor by way of barrier layers 18, each barrier layer being disposed between a shoe and a thermoelement. One of the electrodes 16 is brazed or otherwise joined to bridging member 14, which is likewise brazed to another thermoelement-shoe assembly (not shown). Generally, the thermoelement 12 may be an n-type or p-type semi-conductor and a similar thermoelement (not shown) at the other end of bridging member 14 may be of the opposite conductivity type.

The basic principles involved in the present invention are briefly discussed below.

The present invention provides a thermoelectric device in which the shoe material is prevented from reacting with or diffusing into the thermoelement material, i.e. contaminating the thermoelement, while at the same time providing a shoe having thermal expansion co-efficient properties which are compatable with the thermal expansion co-efficient properties of the thermoelement. The present state of the art is such that no known materials can perform both functions, thus bond failures occur due to one or the other of the conditions which include reaction of contaminants with the thermoelement, poisoning of the thermoelement or fracturing due to thermal stresses.

It is known that, in the case of thermoelectric devices employing semi-conductor materials in conjunction with certain shoe electrode materials, the continuous or repetitive exposure of the device to temperature variations in the 100°C to 600°C range causes, over a period of time, the atoms of the electrode or certain compositions thereof to diffuse into the thermoelement material or react therewith (i.e. contaminate the thermoelement). For example, nickel or iron when used as an electrode with a Tellurium alloy thermoelement may diffuse therein, the atoms of nickel or iron forming a solid state solution therewith. When this occurs, the thermoelectric properties of the thermoelement deteriorate until, in some instances, the thermoelement ceases to function efficiently due to lowering of the Figure of Merit, i.e. lowering of Seebeck coefficient and increasing thermal conductivity. At the same time, due to this continuous diffusion, the bond itself between the shoe and the thermoelement deteriorates by chemical reaction, and eventually the electrode may break loose from the thermoelement.

The thermoelectric device is preferably constructed so that the shoe is selected from a class of materials which are thermally compatable with the thermoelement material; that is, they have substantially the same thermal coefficient of expansion as the thermoelement. The reason for this is that the shoes generally are constructed of a relatively large mass of material such that when subjected to temperature variatons over a range, for example, of 100°C to 600°C, the differences of thermal coefficients between the shoe material and the thermoelement material, if permitted to exist, would cause stress failures in the weaker of the two materials, usually the semi-conductor.

Secondly, the reaction of the shoe material with or diffusion of the shoe material into the thermoelement material which would otherwise result if permitted or occur is prevented by providing a barrier between the shoe and the thermoelement which is acceptable with respect to both the thermal and contamination conditions. Such a barrier has been found to be provided by a layer of refractory material which is a class of material which does not diffuse to or contaminate the thermoelement material during the normal operating temperatures of these thermoelectric devices, and is impermeable to shoe material contaminants.

Since such a class of materials is usually not thermally compatable with thermoelement materials in that the preferable refractory materials have substantially different coefficient of thermal expansions than the corresponding preferable semi-conductor materials, the refractory layer is provided as a "skin" between the thermoelement and the shoe. Therefore, the barrier has a thickness such that the forces arising from the thermal properties of the barrier are miniscule as compared to the forces exerted by the greater masses of the shoe and thermoelement materials. Thus, the greater tensile strength of the refractory material over the semi-conductor material is ineffective to adversely affect the bond due to its comparatively smaller mass, and, to the contrary, the barrier stretches or contracts with the adjacent materials.

For example, a barrier of about 0.05 to 0.5 mils thick may be used with a shoe of about 10 to 40 mils thick in which the coefficient of expansion of the barrier is about $5 X 10^{-6}/o_c$ while that of the shoe is about 12 to $18 X 10^{-6}/o_c$. In essence, the barrier of this type is substantially impermeable to the contaminants and thus blocks the diffusion of contaminants from the shoe to the thermoelement.

Another embodiment of the present invention incorporates a barrier which is permeable to contaminants from the shoe. In this instance, the contaminants diffuse into the barrier layer and are absorbed thereby, but do not penetrate through the barrier to the thermoelement.

In this form, a barrier layer of a composition of material selected from the same class of materials as the thermoelement is disposed between the shoe and the thermoelement. When contaminants from the shoe diffuse into this barrier layer, they form a solid solution therewith until the barrier layer is saturated. Such a barrier has been found to have a life of about 5 years under accelerated test conditions, as compared to only several months with present state of the art devices. Of course, such a life expectancy also depends upon the thickness of the barrier layer and the amount of contaminants capable of diffusing from the shoe. This thickness is such that it is thick enough to absorb the diffusing contaminants over a minimum life span and yet thin enough so as not to inpart its own thermoelectric properties in an adverse manner to the device. If made thick enough, this barrier layer would act as a second thermoelectric device having uncontrolled variable properties in the sense that as contaminants diffused therein, the thermoelectric properties would change. A suitable thickness, for example, for such a barrier has been found to be about 10 to 20 mils, 20 mils being preferable.

In a barrier of this type, although of the same class of materials as the thermoelement the microcrystalline or grain structure of the barrier is formed substantially different than the microcrystalline or grain structure of the thermoelectric material, both materials being polycrystalline. For example, a normal ingot of thermoelectric material has crystals which are columnar in structure; that is, they are elongated, the crystals having been grown by a standard technique such as the Bridgman technique.

By forming a polycrystalline structure so that the microcrystals therein are equiaxed rather than elongated, the diffusion properties of the material are altered to provide a material capable of use as a barrier. Formation of the polycrystalline structure of thermoelectric materials for use as a barrier may be accomplished by using sputtering, vapor deposition, silk screening or cataphoretic deposition. Although the reason for this new property of the crystal or grain structure of thermoelement barrier materials is not well understood, a possible theory for such results is that the diffusion paths for the impurities are altered by increasing the number of microcrystals present in a unit volume. Since diffusion takes place along grain boundaries, then it is believed that by reducing the size of the crystalline or grain structure of the thermoelement and thus altering the grain boundary paths present, a sink is provided for the diffusing contaminants.

For example, an ingot of lead telluride (PbTe) 8 inches long by ⅝ inch in diameter was grown by the Bridgman technique as described in Preparation of Single Crystals by Larvson and Nielson, published by Academic Press Inc. New York, New York 1958 at page 14. A 10 mil slice was then bonded in a manner to be described to a shoe and a lead telluride thermoelement.

A second sample of lead telluride was ground into a powder and formed into a slurry. The slurry was cataphoretically deposited on the shoe and cold pressed to reduce excess porosity. The shoe and barrier were then bonded in a manner to be described to a lead telluride thermoelement. Both the lead telluride slice and the cataphoretically deposited layer were bonded simultaneously under the same conditions. Tests revealed that the 10 mil slice was not effective as a barrier while the thermoelement material deposited by cataphoretic deposition, which formed the barrier micorcrystal structure was effective as a barrier. It is apparent that the smaller, equiaxed microcrystal, i.e. one that has the same cross-sectional area in all planes, functions as a barrier while the columnar, elongated structure does not.

Another form of the present invention is a device in which both types of barriers are incorporated. That is, the impermeable barrier is used in conjunction with the permeable type. The combination substantially improves the life of the device as compared to either barrier utilized singly. In this form, the impermeable barrier layer is disposed between the permeable barrier layer and the shoe, the latter barrier being disposed adjacent the thermoelement material.

A critical area of construction in the device of the present invention is the bonding of the barrier layer to the thermoelement. Usually such bonding is effected with a material which is of the type which diffuses into and contaminates the thermoelement. To preclude such an occurrence, the method herein disclosed creates such a bond while avoiding adverse diffusion which might otherwise occur, and at the same time provides a low resistance, mechanically secure bond.

Accordingly, a layer of nickel, which diffuses into some thermoelements, especially lead-telluride, is disposed between the thermoelement and the next adjacent barrier layer, whether it be the permeable or impermeable type. Some of the nickel is first diffused into the barrier layer and then the enitre assembly is fired at a suitable temperature and time in preferably a reducing atmosphere of hydrogen while a predetermined pressure is applied to the assembly to urge the shoe barrier assembly and thermoelement together such that most of the eutectic alloy formed between the nickel and the thermoelement material is forced from the interface between the thermoelement and barrier layer.

In this interface a layer of alloy remains which readily bonds to the diffused nickel in the barrier while the alloy is made sufficiently thin to prevent subsequent deleterious poisoning of the thermoelement and sufficiently thick to provide a stable, metallurgical bond between the thermoelement and the barrier. Such an alloy has been found to have a thickness of 0.05 and 0.10 mils.

With reference to FIG. 1, the thermoelectric leg comprising thermoelement 12, barrier layer 18, and electrode 16 may be of any suitable shape but preferably is cylindrical or disk shaped. The electrode shoes 16 are made of a material having a thermal coefficient of expansion such that thermal stresses which may cause bond failure between the shoe and thermoelement due to different thermal coefficient are not created thereby when the assembly is subjected to thermal shock when the temperature is varied over the operating range, about 100°C to 600°C, as indicated above, that is, the coefficient of thermal expansion of the shoes 16 is substantially the same as, or closely matched to that of thermoelement 12. Such a material for the electrodes generally comprises elements which also diffuse into the thermoelement 12. A material which is suitable as a shoe having these characteristics may be selected from the group consisting of stainless steel, nickel, iron, chromium, and aluminum.

However, although thermal shock is precluded by selecting the material for the shoes from the group indicated, the diffusion or contamination problem is present. These electrode materials ordinarily will diffuse into and react with thermoelement 12, changing the thermoelement properties and cause bond failure of the thermoelement device.

To prevent this condition from occurring, barrier layer 18 is disposed between electrode shoe 16 and thermoelement 12. One form of barrier layer 18 is a material selected from a group which blocks the diffusion of the shoe material into the thermoelement; that is, the impermeable type of protective material is disposed between the shoe and the thermoelement. These barrier or impereable materials are refractory materials and may be selected from the group consisting of tungsten, tungsten carbide, molybdenum, carbon, and silicon carbide when the thermoelement is designed for use in the 100°C to 600°C range. The difficulty in utilizing these materials as electrode shoes rather than as a barrier, as shown in the prior art, is that the barrier material has a substantially different coefficient of expansion than that of thermoelement 12, which when subjected to thermal shock, causes failure of the bond between the shoe and the thermoelement as described above.

Preferably barrier layer 18, although having a substantially different coefficient of thermal expansion than the thermoelement 12, is made sufficiently thin so that the barrier material will "give" with the larger shoe and thermoelement masses and therefore will not cause failure of the bond due to thermal stresses. Thus the barrier layer will physically deform with the joint. However, while being thin enough to deform with the joint as the joint expands or contracts, the barrier should be thick enough to prevent migration of contaminants in the material of electrode shoe 16 to thermoelement 12. For example, a barrier layer of tungsten 0.05 to 0.5 mils thick may be bonded on one side of the shoe (10 to 40 mils thick) while the thermoelement is bonded to the other side of the barrier layer in a manner to be described.

Specifically, the thermoelement semi-conductor 12 of FIG. 1 may be made of a material selected from the group consisting of lead telluride, bismuth telluride, lead-tin telluride, alloys, of lead telluride-germanium telluride and alloys of lead telluride-lead selenide.

A second form of barrier layer 18 is where the material of the layer is selected from the permeable group which absorbs the migrating contaminants of the shoe material and prevents their diffusion to the thermoelement, at least until the barrier is saturated. This barrier material may also be disposed between the electrode shoe 16 and thermoelement 12, but is preferably used in conjunction with the impermeable type of barrier forming a double layer of barrier materials. In the permeable type of barrier layer, in which a lead telluride material is used as the thermoelement, a thickness of about 20 mils of lead telluride having microcrystalline structure substantially different than the thermoelement so that the diffusion rate of contaminant therein is substantially slower in the barrier than in the thermoelement, disposed between the thermoelement and a tungsten barrier layer utilizing a stainless steel shoe, was found to be satisfactory. A permeable type of barrier of lead telluride having a thickness of 10 to 20 mils was found to be thin enough to prevent spurious electrical generation and thick enough to prevent diffusion of contaminants to the thermoelement.

To produce the device shown in FIG. 1, a suitable bonding material should be employed, such as nickel. It is known that nickel is an impurity which will diffuse into tellurium alloys, e.g. and contaminate the thermoelement in a similar manner as would occur between the electrode shoe and the thermoelement indicated previously. Thus, a procedure will be described in which the members of the device may be bonded utilizing a potential source of contamination such as nickel.

A nickel layer is deposited onto the electrode shoe 16, which is preferably made of a stainless steel. Deposition may be by any suitable technique which may include electroplating, electroless plating, vapor deposition, or deposition from organic solutions. The nickel is deposited to a thickness of 0.05 to 0.15 mils, and then diffused into the stainless steel shoe. This diffusion may be accomplished by firing the shoe and nickel layer in preferably a reducing atmosphere of hydrogen at approximately 800°C for about 10 minutes, the reducing atmosphere preventing the formation of oxide layers. Any other suitable atmosphere which will prevent contamination during the diffusion process would also be suitable. This temperature and time is applicable for nickel and any of the shoe materials of the class mentioned.

The stainless steel shoe and nickel layer, some of which has been diffused into the shoe, is next coated with a thin layer, preferably of tungsten. The tungsten is deposited to a thickness of 0.1 to 0.5 mils by the thermal decomposition of tungsten hexafluoride ($WF_6$) or from tungsten resinate solutions. Of course, other means for depositing tungsten may be utilized as long as the comtamination and thickness requirements are maintained. Once having deposited the layer of tungsten, a thin layer 0.05 to 0.15 mils of nickel is deposited over the tungsten layer using any of the processes mentioned. This second layer of nickel is then diffused into the tungsten layer and at the same time the first layer of nickel is also diffused into the tungsten forming a metallurgical bond between the tungsten and the shoe. These diffusions take place in a suitable reducing atmosphere such as hydrogen at approximately 800°C for about 10 minutes. At this point both the barrier layer and the shoe have nickel diffused therein at the common bond therebetween and, in addition, nickel is diffused on the side of the barrier layer opposite the shoe interface. Thus, there is a solid state bond between the shoe and the tungsten layer.

Figure 3:
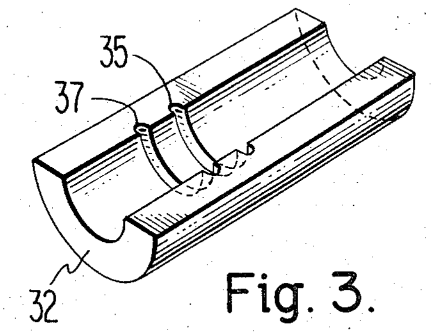
FIG. 3 is a perspective view of half a mold used in making the device of FIGS. 1 and 2.
Figure 4:
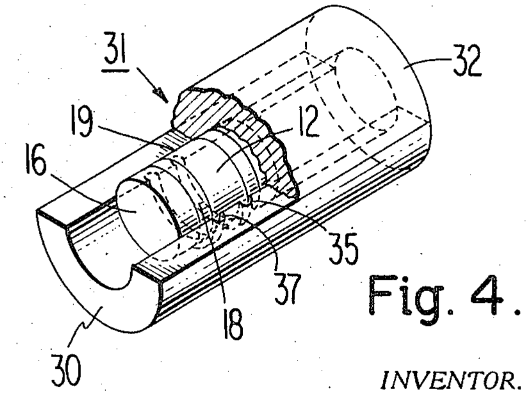
FIG. 4 is a perspective view of the thermoelement of FIG. 1 at an intermediate stage of manufacture.

To bond the shoe and barrier layer to the thermoelement material, the assembly is inserted into a suitable mold such as that shown in FIG. 3, which is one half 32 of a split graphite mold. Mold half 32 of FIG. 3 is long enough to enclose the complete thermoelement subassembly 19 of FIG. 1 including the shoes 16 to be added thereto at both ends. As seen in FIG. 4, half 32 of mold 31 containing the subassembly 19 to be bonded is mated with its opposite half 30 in a known manner enclosing the thermoelement subassembly therebetween. In the mold are two parallel grooves 35 and 37 which are formed in the interior periphery of the mold. These grooves are spaced such that they are adjacent to the interface of the thermoelement and barrier layers to accept excess eutectic material forced out from the interface in the manner to be described. Rams (not shown) are inserted at each of the ends of the mold to apply pressure to the shoes 16 in contact therewith. The two mold halves with the thermoelement disposed therein are then placed in a chamber having a suitable atmosphere for bonding the thermoelectric assembly 19 together.

The chamber is first evacuated to a vacuum of $10^{-4}$ torr. The system is purged with a gas mixture of 95% argon and 5% hydrogen for approximately 5 minutes. Of course, any suitable inert gas may be utilized. A pressure of 60-100 psi using a hydrogen atmosphere is applied to the chamber to seat the parts, and while under pressure, the chamber is then heated to a temperature of 745°C to 755°C. This temperature is maintained for approximately 2 minutes and the system is then allowed to cool in the pressure gas stream which is flowing through the chamber.

The temperature is sufficiently high to form a eutectic layer of nickel-lead telluride alloy disposed between the tungsten barrier and the lead telluride element. The pressure on the subassembly forces out most of this eutectic material into the grooves 35 and 37 of the mold 31. What is left at the interface between the barrier and the thermoelement is a thin layer of eutectic alloy of nickel and lead telluride. This alloy has a thickness sufficiently thin to prevent poisoning of the thermoelement material and sufficiently thick to wet the nickel diffused surface of the tungsten barrier and form the bond between thermoelement material 12 and the barrier layer 18. A preferable thickness for such an alloy as indicated is about 0.05 to 0.10 mils.

The forcing out of the alloy removes any impurities that may be present in the surface of the interface while at the same time the tungsten barrier has been completely wetted forming a stable durable metallurgical bond therebetween. The method described above has been found to be preferable where lead telluride is used as a thermoelement 12 and stainless steel is utilized for a shoe 16 with tungsten as a barrier 18.

Figure 2:
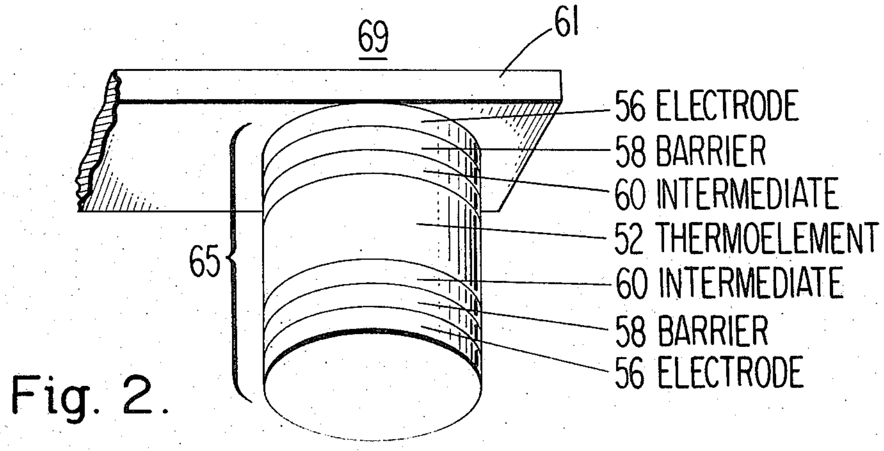
FIG. 2 is a perspective view of a thermoelement in accordance with a second embodiment of the invention.

FIG. 2 illustrates another embodiment of the present invention. In FIG. 2, the thermoelement 52 is coupled to electrode shoes 56 on one axis of the thermoelement at opposite ends of the thermoelement. Disposed between each of electrode shoes 56 and thermoelement 52 is barrier layer 58 and barrier layer 60. This device is similarly constructed as the device of FIG. 1 except for the second barrier layer 60. To simplify description, the barrier layer 60 next adjacent the thermoelement will herein after be referred to as an intermediate layer. Electrode shoe 56, barrier layer 58 and thermoelement 52 may be selected of the same material as that described above for the thermoelectric generator of FIG. 1. The one difference being that intermediate layer 60 is deposited between barrier layer 58 and thermoelement 52.

Barrier layer 58 in the same manner as described above is thin enough to "give" with thermal stresses which may occur during thermal shock preventing the fracturing of the bond while being thick enough to prevent diffusion of contaminants from shoe 56 to thermoelement 52. For example, a thickness of 0.05 to 0.5 mils meets this condition. The material of shoe 56 is preferably substantially the same or closely matched coefficient expansion as the thermoelement 52 to prevent thermal stresses which otherwise would be induced between the thermoelement 52 and shoe 56 and which would cause failure of the structure. Preferably shoe 56 is made of stainless steel, barrier 58 is made of tungsten and thermoelement 52 and intermediate layer 60 are made of lead telluride. Layer 60, as indicated, could be any one of the tellurium alloys mentioned, but having a substantially difference crystalline structure than the thermoelement material.

To form the bond between shoe 56 and thermoelement 52, nickel is deposited on one surface of shoe 56 preferably to a thickness of approximately 0.05 to 0.15 mils. A layer of tungsten is then deposited on the nickel preferably to a thickness of approximately 0.1 to 0.5 mils. Nickel and tungsten may be applied by the methods indicated previously. This electrode and tungsten assembly is then placed in a suitable atmosphere, preferably a reducing atmosphere of hydrogen and heated to temperature of 800°C for about 10 minutes. The nickel is diffused into the electrode shoe and tungsten at the interface therebetween.

The above assembly is then coated with nickel deposited on top of the tungsten layer to a thickness of 0.05 to 0.15 mils. On top of this nickel coating, a layer of material of substantially the same material as the thermoelement material, preferably lead telluride, is deposited to a thickness of about 10 to 20 mils to form intermediate layer 60. Layer 60 may be deposited by sputtering, cataphoretic deposition, vapor deposition, or silk screening to form the equiaxed crystalline structure noted above. This assembly is heated in a suitable atmosphere such as hydrogen to a temperature of 800°C for about 10 minutes, which diffuses some of the nickel into the tungsten layer while the remaining nickel forms an eutectic alloy with the lead telluride. The diffused nickel and alloy form a bond which joins the intermediate layer 60 of lead telluride to the barrier layer 58 and the shoe 56.

After diffusing the nickel and forming the eutectic bond, nickel is coated over the thermoelement intermediate layer 60 to a thickness of about 0.05 to 0.15 mils. This subassembly is then placed adjacent the thermoelement, preferably lead telluride, in a graphite mold such as illustrated in FIG. 3 and FIG. 4, such that the grooves 35 and 37 in the mold and the lead telluride and intermediate layer 60 interface are substantially in line. Rams (not shown) are placed adjacent the shoes in the mold and the assembly is placed in a bonding chamber. Again the eutectic layer to be formed between the thermoelement 52 and the intermediate layer 60 is thin enough to prevent the nickel in the alloy from poisoning the element and thick enough to form the bond between thermoelement 60 and thermoelement 52. This thickness should be maintained at approximately 0.05 to 0.10 mils. The process described previously for the single barrier layer is repeated for the double barrier layers. As was the case in the assembly of the device of FIG. 1 without the intermediate layer 60, the barrier 58 prevents contamination of the thermoelement 52 while not impairing the thermoelectric properties thereof; however, the intermediate layer 60 provides a second barrier between the impurities in shoe 56 and the thermoelement 52.

Both ends of the thermoelement as shown in FIGS. 1 and 3 are bonded to the shoes 16 and 56 respectively at the same time as illustrated in FIG. 4. Bridging member 61 may subsequently bond the plurality of assemblies 65 by brazing to either of shoes 16 and 56 as the case may be.

The amount of nickel deposited between barrier or intermediate layer 60 and barrier layer 58 is not as critical as the amount of nickel disposed adjacent thermoelement 52 for the reason that layer 60 is in itself a barrier to the diffusion of contaminants in the manner described. The thickness of the eutectic layer between barriers 58 and 60 is a function of the thickness of the layer of nickel deposited therebetween and need not be forced from the interface as is the case for the eutectic adjacent the thermoelement.

The 0.05 to 0.1 mils eutectic layer should be maintained regardless of the amount of thermoelement present. As long as this thickness is maintained, it has been found that poisoning of thermoelement by the alloy at this interface will not occur.

In an another example of a thermoelectric generator constructed in accordance with the arrangement of FIG. 1, an iron shoe was bonded to a lead-telluride thermoelement utilizing a barrier layer made of substantially the same material as the thermoelement. That is, an 0.010 to 0.040 thick shoe was bonded utilizing a barrier of the permeable type.

In this construction nickel was diffused into the iron, the barrier layer was deposited onto the diffused nickel layer, a second layer of nickel was deposited on the barrier layer, and then the assembly was fired in the same manner as described for the tungsten barrier. A third layer of nickel was deposited on the barrier layer, the thermoelement was assembled thereto, and the assembly was bonded at a temperature, pressure, and time of 800°C, 60–100 psi and 2 minutes in a suitable atmosphere such as hydrogen. The eutectic layer was forced from the interface leaving a thickness of 0.05 to 0.10 mils of alloy and a stable, bonded thermoelectric generator was created. The layers of nickel are deposited similarly as described above.

What is claimed is:

1. A thermoelectric device comprising:

a thermoelement comprising a material selected from the group consisting of lead telluride, bismuth telluride, lead-tin telluride, alloys of lead telluride-germanium telluride and alloys of lead telluride-lead selenide, an electrode shoe, the material of said shoe being selected from the group consisting of stainless steel, iron, nickel, aluminum and chromium, a barrier layer disposed between said thermoelement and said electrode shoe, said barrier layer comprising a material selected from the group consisting of tungsten, molybdenum, tungsten carbide, silicon carbide and carbon, said barrier layer being thin enough to deform with expansion and contraction of said shoe and said thermoelement when subjected to temperature variations and thick enough to prevent contaminants from penetrating therethrough, and a bonding material for bonding said electrode shoe, barrier and thermoelement together comprising nickel diffused into said electrode shoe and both sides of said barrier layer and alloyed with said thermoelement to form an alloy layer between said thermoelement and said barrier layer, said alloy layer having a thickness in the range of 0.05 to 0.1 mils.

* * * * *